United States Patent [19]

Hughes et al.

[11] 4,184,883
[45] Jan. 22, 1980

[54] PITCH BONDED REFRACTORY

[75] Inventors: Ronald H. Hughes, Clearfield; Robert Morena, Irvona, both of Pa.

[73] Assignee: Eltra Corporation, Toledo, Ohio

[21] Appl. No.: 751,399

[22] Filed: Dec. 17, 1976

[51] Int. Cl.² ............................................. C04B 35/52
[52] U.S. Cl. ...................................... 106/56; 106/58; 106/65; 106/70
[58] Field of Search ................... 106/56, 58, 65, 70

[56] References Cited

U.S. PATENT DOCUMENTS

| | | | |
|---|---|---|---|
| Re. 27,111 | 3/1971 | Wilson | 106/58 |
| 218,336 | 8/1879 | Thomas | 106/58 |
| 3,141,790 | 7/1964 | Davies et al. | 106/58 |
| 3,236,664 | 2/1966 | Wilson | 106/56 |
| 3,468,683 | 9/1969 | Montgomery | 106/56 |
| 3,556,822 | 1/1971 | Henry et al. | 106/56 |
| 3,594,455 | 7/1971 | Polovoi | 106/56 |
| 3,664,853 | 5/1972 | Leonard et al. | 106/56 |
| 3,689,299 | 9/1972 | Brown et al. | 106/56 |
| 3,840,485 | 10/1974 | Brown et al. | 106/56 |
| 3,994,738 | 11/1976 | Visser | 106/56 |

FOREIGN PATENT DOCUMENTS 614742 2/1961 Canada.

OTHER PUBLICATIONS

"The Condensed Chemical Dictionary," Van Nostrand Reinhold Co., 1971, p. 37.
*Hackh's Chemical Dictionary*, 4th ed. (1969), pp. 31–33.

*Primary Examiner*—L. Dewayne Rutledge
*Assistant Examiner*—John P. Sheehan
*Attorney, Agent, or Firm*—John C. Purdue

[57] ABSTRACT

A pitch bonded refractory is disclosed. The refractory consists essentially of size graded aggregate particles, pitch and a cure accelerator for the pitch. The cure accelerator can be magnesium hydroxide, magnesium nitrate, calcium nitrate, zinc nitrate, ferrous nitrate, ferrous sulfide, magnesium carbonate, ferric oxide, ferrosoferric oxide or ferrous sulfate, and can constitute from ½ to 2 percent of the refractory, based upon the weight of the aggregate. The pitch can be either coal tar pitch or petroleum pitch, and can constitute from about 3 to 12 percent, based upon the weight of the aggregate.

10 Claims, No Drawings

PITCH BONDED REFRACTORY

BACKGROUND OF THE INVENTION

Pitch bonded refractories have been known at least since 1879, being disclosed in U.S. Pat. No. 218,336, Thomas, granted on August 5 of that year. However, the production of such refractories on a large scale in the United States did not commence until about the mid 1950's, when their manufacture for use as linings for basic oxygen furnaces commenced. Additions of a solid carbonaceous material, e.g., carbon black to pitch bonded basic refractories for oxygen vessel use was suggested by Hodnett, Canadian Pat. No. 614,742, granted Feb. 14, 1961, and channel black and fine thermal black as specific carbon black additives were suggested by Wilson, U.S. Pat. No. Re. 27,111, granted Mar. 30, 1971. Montgomery, U.S. Pat. No. 3,468,683, granted Sept. 23, 1969, suggests that pitch bonded refractories wherein the aggregate is dead burned, and is either dolomite or a blend of dolomite with magnesite* can be improved with respect to both hydration resistance and "hot crushing strength" by additions to the batch of elemental sulfur.

*The term "dead burned magnesite" is used herein, and in the appended claims, to refer to a dead burned material produced by firing naturally occurring magnesium compounds.

In general, pitch bonded refractories are produced by blending a size graded aggregate and molten pitch to form a batch, introducing a predetermined volume or weight of the batch into a mold, and pressing the batch into a brick. It is common practice for the brick manufacturer to "temper" pitch bonded refractories by heating them to a comparatively low temperature, e.g., 500° F., for several hours. This tempering causes distillation of the more volatile components of the pitch binder, and may cause polymerization of some of the constituents of the binder which are not distilled. In any event, the average softening point of the pitch binder of the refractories is increased by the tempering step.

When pitch bonded refractories are used in basic oxygen steel making, a basic aggregate is required, and they are commonly called pitch bonded basic refractories. In such service they are used to line enormous bottle-shaped vessels to which it is common to charge as much as 300 tons of hot metal from a blast furnace and scrap, as well as substantial quantities of slag-forming ingredients. The charge is then refined, e.g., by blasting the molten surface with a stream of pure oxygen traveling at supersonic speed or by introducing oxygen into the melt through tuyeres in the bottom of the vessel. Before its first "heat" or refining operation, a new lining is first "burned in" by combusting a fuel inside the vessel to heat the lining to a comparatively high temperature. This burning-in causes distillation of some of the lower boiling constituents of the binder, may cause polymerization of other constituents, and ultimately causes carbonization of the remaining binder constituents and the formation of a carbon bond adjacent to the hot face of the refractories in the lining. It is this carbon bond which gives the lining the strength which is necessary for it to withstand the stresses to which it is subjected during the steel making operation. As the vessel is used, and the lining wears away, the region in which the binder is carbonized advances gradually toward the cold face of the vessel lining.

It will be appreciated that the pitch bonded basic refractory lining of an oxygen vessel is particularly vulnerable during burn-in and during the early heats of its campaign. If the softening point of the residual binder is exceeded prior to carbonization for any given brick, that brick, as a practical matter, has no binder and even a slight stress, for example that to which it is subjected by adjacent bricks, can cause large fragments of the brick to break away; this phenomenon is called spalling. It has been observed that spalling of pitch bonded basic refractory linings in oxygen steel making vessels is more likely to occur during burn-in and during the early heats of its campaign. The vulnerability of brick during this part of the campaign, as described above, is believed to be responsible for the observed excessive spalling.

BRIEF DESCRIPTION OF THE INVENTION

It has been found that pitch bonded basic refractories made from a batch which contained a comparatively small addition of calcium nitrate have been substantially, if not completely, free of spalling during burn-in and during early heats of campaigns. It has also been discovered that refractories made from batches containing calcium nitrate and other additives have higher strengths at elevated temperatures, e.g., 950° F., than do control specimens made from a batch containing no additive, and that coal tar pitch containing added calcium nitrate has a significantly higher coking value than does the same pitch with no additive. These discoveries are believed to indicate, although this invention is not limited to or by the following suggested explanation, that the additives which have been studied change the chemical behavior of coal tar pitch when subjected to heat, probably causing an increase in the rate at which constituents thereof polymerize; consequently, when a pitch binder containing one of the additives in question is tempered, the action of the additive causes the softening point of the pitch to increase at a rate greater than that at which the softening point of the pitch containing no additive increases. It appears that one consequence of the polymerization is a decrease in the distillation of volatile components as heating progresses, and that another is an increase in the rate at which the softening temperature of the binder increases as the temperature rises.

OBJECTS OF THE INVENTION

It is, therefore, an object of the present invention to provide an improved pitch bonded refractory consisting essentially of size graded aggregate particles, pitch and a cure accelerator for the pitch.

Other objects and advantages will be apparent from the description which follows, including the examples, which are presented solely for the purposes of illustrating and disclosing, but not of limiting, the invention.

DETAILED DESCRIPTION OF THE INVENTION

The essence of the instant invention will be apparent from the following Example 1, which constitutes the best presently known mode.

EXAMPLE 1

Pitch bonded basic refractories were prepared from a batch made up of 100 parts* dead burned periclase** ranging from −3 mesh to ball mill fines, 2.3 parts thermal black, 1.0 parts calcium nitrate and 4 parts pitch. The ball mill fines constituted 24 percent of the dead burned magnesite; the coarse fraction was −3, +48 mesh. The coarse magnesite fraction was heated to about 420° F. and charged hot to an Eirich high intensity mixer. The total volume of the charge was about one-third the volume of the mixer. The calcium nitrate was then added to the mixer, followed by the unheated ball mill fines and the thermal black. After dry mixing of this portion of the batch for two minutes, coal tar pitch having a nominal softening temperature of 110° C., and heated to 350° F. was added to the mixer. The entire batch was then mixed for five minutes and discharged from the mixer onto a conveyor by which it was transported to a double action mechanical press equipped with a mold 27 inches in length and tapering from a width of 6 inches at one end to a width of 5 inches at the opposite end. The mold was heated to about 310° F. With the lower platen of the press positioned substantially 7½ inches below the top of the mold, and constituting, in essence, a bottom therefor, a charge of the batch sufficient to fill the mold flush with the top was introduced into the mold. The upper and lower platens of the press were then advanced toward one another to compress the charge in the mold. The total force was about 900 tons. The press was controlled so that the platens advanced toward one another until they were a nominal 3 inches apart, and dwelled momentarily; both platens were then moved upwardly so that the upper platen returned to a withdrawn position, while the lower platen advanced until it was flush with the top of the mold, thereby ejecting the pitch bonded basic refractory which had been produced from the mold.

\* The terms "parts" and "percent" are used herein to refer to parts and percent by weight, unless otherwise indicated.
\*\* The term "periclase" is used herein, and in the appended claims, to refer to dead burned MgO produced at least in part from magnesian values recovered from sea water, brines or bitterns.

Refractories produced as described from the batch were loaded onto racks and tempered in a continuous tempering oven. The total cycle in the tempering oven was 13 hours, after which time the rack was withdrawn from the oven and the refractories were moved into a cooling zone where they were cooled to ambient conditions. Temperature during tempering was monitored by means of a traveling thermocouple positioned in the center of a brick which was at the center of the rack. The monitored temperature at various time intervals after the rack was introduced into the tempering oven is set forth in the following Table:

| Time Interval in Hours | Temperature, °F. |
|---|---|
| ½ | 225 |
| 1 | 270 |
| 2 | 340 |
| 3 | 400 |
| 4 | 460 |
| 5 | 530 |
| 6 | 580 |
| 7 | 605 |
| 8 | 625 |
| 9 | 635 |
| 10 | 640 |
| 11 | 650 |
| 12 | 655 |
| 13 | 645 |

The tempered brick had the following properties:

| Bulk Density, pcf | 192.7 |
|---|---|
| Cold M/R*, psi | 1314 |
| 950° F. M/R, psi | 556 |
| Ignited Porosity, % | 17.2 |
| Residual Carbon, % | 5.15 |
| Retained Carbon, % | 81.9 |

*Modulus of rupture.

For purposes of comparison, but not in accordance with the present invention, refractories were made by the procedure described above from a batch identical with that described except that the calcium nitrate was omitted. After tempering, the bricks were found to have the following properties:

| Bulk Density, pcf. | 193.1 |
|---|---|
| Cold M/R, psi | 1423 |
| 950° F. M/R, psi | 103 |
| Ignited Porosity | 16.6 |
| Residual Carbon, % | 4.69 |
| Retained Carbon, % | 77.6 |

The higher residual carbon, as well as the higher modulus of rupture at 950° F., for the brick of Example 1, has been found to be statistically significant. The crushing strength at 950° F. of the brick of Example 1 has also been found to be significantly higher, but is not reported because it was too high to be determined with available test apparatus.

The procedure described in Example 1 has also been used to produce pitch bonded basic refractories from batches containing different amounts of calcium nitrate and, in some instances, elemental sulfur. The aggregate was periclase, and the ball mill fines constituted 18 percent thereof; otherwise except for the proportion of sulfur, calcium nitrate or both, the batches were identical with that described in Example 1. The additions used in each of the batches, and the properties of the tempered brick are set forth in the following Table:

| EXAMPLE | 2 | 3 | 4 | 5 | 6 | 7 | 8 | 9 |
|---|---|---|---|---|---|---|---|---|
| Additions: | | | | | | | | |
| Sulfur, Wt. % | 0 | 0 | 0 | 0.50 | 0.50 | 0.50 | 0.50 | 0.50 |
| Calcium Nitrate, Wt. % | 0.50 | 0.75 | 2.0 | 0 | 0.50 | 0.75 | 1.0 | 2.0 |
| Bulk Density, pcf | 193.47 | 193.20 | 192.40 | 195.13 | 193.77 | 194.88 | 194.49 | 193.41 |
| Cold M/R, psi | 1309 | 1257 | 1482 | 1026 | 1642 | 1044 | 1087 | 1072 |
| 950° F. M/R, psi | 325 | 459 | 622 | 588 | 684 | 741 | 829 | 1035 |
| Ignited Porosity, % | 16.06 | 16.29 | 16.77 | 15.55 | 15.91 | 16.08 | 16.31 | 16.69 |
| Residual Carbon, % | 4.81 | 4.76 | 4.88 | 4.83 | 5.14 | 4.87 | 5.08 | 4.82 |
| Retained Carbon, % | 81.08 | 82.32 | 75.90 | 83.81 | 83.34 | 79.50 | 77.84 | 70.90 |

Pitch bonded basic refractories were also prepared from a batch of 100 parts dead burned magnesia* ranging from −3 mesh to ball mill fines, 2.3 parts thermal black, 1.0 part of each of several additives and 3.7 parts coal tar pitch having a nominal softening temperature of 100° C. The sizing of the dead burned magnesia was the same as that used in producing refractories as described in Example 1; the specific material was a blend of about 3 parts dead burned magnesite with 1 part periclase. The coarse magnesia fraction was heated to about 450° F. and charged hot to a Simpson mixer. The ball mill fines, the thermal black and the additive were then added to the mixer. After dry mixing of this portion of the batch for three minutes, the pitch, heated to about 350° F., was added to the mixer. The entire batch was then mixed for five minutes and transported to a double action hydraulic press equipped with a mold 9 inches in length and 4½ inches in width. The mold was heated to about 300° F. With the lower platen of the press positioned about 7 inches below the top of the mold, and constituting, in essence, a bottom therefor, a 10 pound charge of the batch was introduced into the mold. The upper and lower platens of the press were then advanced toward one another to compress the charge in the mold; the total pressure on the batch in the mold was about 14,000 psi.

* The term "dead burned magnesia", as used herein and in the appended claims, is generic, including dead burned magnesite, periclase, and mixtures of the two.

On the following day, the various refractories produced were tempered by introducing them into a periodic tempering oven which had been preheated to 500° F., and which was controlled to maintain a temperature of 500° F. Seven hours after the tempering oven temperature returned to 500° F., heating was discontinued; the doors of the tempering oven were opened, and the bricks were allowed to cool within the oven.

The identities of the several additives which were investigated and the measured properties of refractories made from the batch containing the several additives are set forth in the following Table. In the Table, a "+" indicates that the preceding value was higher than the number reported because the strength exceeded the capability of the test equipment.

| Example | Additive | Tempered Density (pcf) | Cold M/R (psi) | 950° F. M/R (psi) | 950° F. Crush (psi) | Ignited Porosity (%) | Retained Carbon (%) |
|---|---|---|---|---|---|---|---|
| 10 | Mg(OH)$_2$ | 187.1 | 818 | 97 | 1577 | 18.46 | 79.35 |
| 11 | Mg(NO$_3$)$_2$ | 187.1 | 812 | 202 | 1991 | 18.59 | 80.36 |
| 12 | Ca(NO$_3$)$_2$ | 186.9 | 788 | 204 | 1533 | 19.46 | 77.51 |

-continued

| Example | Additive | Tempered Density (pcf) | Cold M/R (psi) | 950° F. M/R (psi) | 950° F. Crush (psi) | Ignited Porosity (%) | Retained Carbon (%) |
|---|---|---|---|---|---|---|---|
| 13 | Zn(NO$_3$)$_2$ | 187.7 | 850 | 265 | 2454+ | 19.36 | 78.96 |
| 14 | Fe(NO$_3$)$_2$ | 187.1 | 734 | 220 | 1456 | 18.65 | 80.95 |
| 15 | FeS$_2$ | 188.3 | 932 | 112 | 1568 | 17.73 | 79.92 |
| 16 | MgCO$_3$ | 186.3 | 736 | 95 | 1449 | 19.68 | 74.81 |
| 17 | Fe$_2$O$_3$ | 188.1 | 837 | 65 | 1791 | 18.20 | 74.70 |
| 18 | Fe$_3$O$_4$ | 188.1 | 867 | 95 | 1312 | 18.66 | 72.97 |
| 19 | FeSO$_4$ | 188.2 | 904 | 26 | 2021+ | 18.94 | 73.07 |

For purposes of comparison, but not according to the invention, control refractories were made from a batch containing no additive, but otherwise identical with that set forth above. These refractories had a Tempered Density of 186.5, Cold M/R of 778 psi., a 950° F. M/R of 19 psi., a 950° F. Crushing Strength of 759 psi., an Ignited Porosity of 18.59 volume percent and Retained Carbon of 78.16 percent.

Essentially the procedure described above for the production of pitch bonded basic refractories using a double action hydraulic press was used to produce pitch bonded refractories wherein the aggregate was dead burned dolomite, carbon, an aluminosilicate grain and relatively pure alumina grain. Information concerning these refractories and their physical properties after tempering for seven hours at 500° F., and concerning contemporaneously produced and tempered refractories where the aggregate was periclase, is set forth in the following Table. The specific aluminosilicate grain used contained about 60 percent of Al$_2$O$_3$ and 35 percent SiO$_2$, remainder other oxide impurities; it was purchased under the trade designation "Mulcoa 60".

| Example | Aggregate | Size Range | Pitch, Percent* | Thermal Black, Percent* | Ca(NO$_3$)$_2$ | 950° F. M/R |
|---|---|---|---|---|---|---|
| 20 | Dead burned dolomite | −3 mesh to BMF | 4 | 2.3 | 1.0 | 237 |
| Control | " | " | " | 2.3 | None | 123 |
| 21 | Dead burned periclase | −3 mesh to BMF | 4 | None | 1.0 | 328 |
| Control | " | " | " | 2.3 | None | 117 |
| 22 | " | " | " | 2.3 | 1.0 | 315 |
| 23 | Carbon | −3 mesh to BMF | 10 | 2.3 | 1.0 | 135 |
| Control | " | " | " | 2.3 | None | 91 |
| 24 | Aluminosiliate grain | −3½ mesh to BMF | 5 | 2.3 | 1.0 | 479 |
| Control | " | " | " | 2.3 | None | 445 |
| 25 | Alumina grain | −6 mesh to BMF | 4 | 2.3 | 1.0 | 444 |
| Control | " | " | " | 2.3 | None | 284 |

*Based upon the weight of the aggregate.

Pitch bonded aluminosilicate refractories can be used as linings for ladles or for hot metal transfer cars in which molten pig iron is transferred from blast furnaces to steel making furnaces. Pitch bonded carbon refractories are particular useful in electric steel making furnaces, especially in the mast wall.

In general, the amount of coal tar or petroleum pitch in a refractory according to the instant invention can range from 3 to 12 percent, based upon the weight of the aggregate. However, as is well known to those skilled in the art, the phenomenon of dense packing is important in all refractories. Accordingly, size graded aggregates are used so that smaller particles of the aggregates will fit in the voids which inherently form when larger sized portions of the aggregates are packed together, for the intermediate sized particles in the interstices which inherently form when still larger particles are packed together. It is, of course, impossible to fill all of the interstices in any refractory body with solid aggregate particles. The goal, in pitch bonded refractories, is to use an amount of pitch which will fit in the interstices among the solid aggregate particles, and adhere the latter to one another without reducing the packed density, based solely upon the aggregate, which could be achieved without a pitch addition. What this proportion is depends, inter alia, upon the size structure of the aggregate and the contact angle between the pitch and the aggregate. Because, perhaps, of greater porosity or, possibly, because a carbon aggregate is wetted, a higher proportion of pitch can be used in producing pitch bonded carbon refractories than is desirable with other aggregates, e.g. dead burned magnesia, dead burned dolomite, aluminosilicate and alumina. In general, from 8 to 12 percent of pitch is desirable in carbon refractories, while from 3 to 8 percent, most desirably 3 to 6 percent, of pitch is preferable in refractories of the other named aggregates.

It will be apparent from the foregoing data that sulfur is advantageously, but not necessarily, used in refractories according to the invention. When used, sulfur preferably constitutes from ¼ to 1 percent, based upon the weight of the aggregate. Thermal black is also advantageously, but not necessarily, employed. When used, it preferably constitutes from 1½ to 3 percent, based upon the weight of the aggregate.

Pitch-bonded basic refractories were produced by the method described in Example 1 from a batch consisting of 100 parts periclase, 3.7 parts petroleum pitch, 2.3 parts thermal black, 1.0 part calcium nitrate and 20 parts scrap from previously produced pitch-bonded dead burned magnesia refractories. The periclase ranged in size from −3 mesh to BMF. The coarse fraction was −3, +48 mesh and constituted 82 percent of the periclase. The scrap refractory was added as a −4 mesh fraction. These refractories were found to have modulus of rupture at 950° F. of 533 psi; this compares with the modulus of rupture at 950° F., of 80 psi for substantially identical refractories produced contemporaneously without a calcium nitrate addition.

Conradson coking values, ASTM D 2416-68, were determined for a coal tar pitch having a nominal softening temperature of 110° C. and for the same pitch to which a 25 percent addition, based upon the weight of the pitch, of calcium nitrate had been made. The pitch itself had a coking value of 58.91, while the pitch with added calcium nitrate had a coking value of 73.56. The increased coking value caused by an addition of calcium nitrate indicates that the improved properties of refractories according to the instant invention are attributable to interaction between the additives and the pitch, and that the nature of the aggregate is immaterial. This is also borne out by the data in the foregoing Table concerning Examples 20-25 and their respective controls.

It has been found that the hot modulus of rupture of pitch bonded refractories according to the invention varies with changes in either temperature or duration, within certain limits, of tempering. For example, in one series of tests, bricks produced as described in Example 1* were tempered at temperatures ranging from 300° F. to 800° F., some for six hours at temperature and some for three hours at temperature. The 950° F. modulus of rupture of the brick tempered for six hours at temperature varied as a direct function of tempering temperature from a low of about 300 psi. when that temperature was 300° F. to a high of about 760 psi. when that temperature was 800° F. The 950° F. modulus of rupture of brick tempered for three hours decreased from about 430 psi. when the temperature was 300° F. to about 380 psi. when the temperature was 500°, and then increased to about 640 psi. when the temperature was 800° F. In general, tempering temperature ranging from 300° to 800° F. are considered to be satisfactory, as are times at temperature ranging from three to ten hours. Longer tempering times can be used, but appear to be unnecessary, and to cause no further improvement in properties. Tempering temperatures ranging from 400° to 600° F. are preferred, and there are indications that temperatures ranging from 525° to 575° F. are optimum.

* Except for an immaterial variation in periclase sizing.

Calcium nitrate is the preferred additive in pitch bonded refractories according to the invention. The preference for this material stems from its effectiveness and availability, as well as from cost considerations. It is apparent from the foregoing data that significant improvement in pitch bonded refractories is achieved when they contain as little as one-half percent, based upon the weight of the aggregate and that the use of more than about two percent gives comparatively little improvement, although it is not detrimental. Preferably, refractories according to the invention contained from about ¾ percent to about 1½ percent of the additive.

A deformation under load test which has been carried out is illuminating as to the previously suggested mechanism which is believed to be responsible for the reduction in early campaign spalling in bricks according to the instant invention. The test involves heating the refractory being tested while that refractory is under a load of 50 psi., and measuring linear deformation of the refractory as a function of temperature. Untempered bricks produced as described in Example 1* and bricks, whether tempered or untempered, so produced but with no calcium nitrate or equivalent addition show a comparatively small increase in the measured dimension as the temperature increases to about 270° F., and then show a rapid decrease in the measured dimension at temperatures higher than 270° F.; such performance is considered to be indicative of a "failure". Brick produced as described in Example 1* and tempered at 400° F., seven hours at temperature, show a comparatively slight increase in the measured dimension as the temperature increases to about 350° F., followed by comparatively sharp decreases in the measured dimension as the temperature increases to about 600° F.; however, as the temperature increases above 600° F. the measured dimension begins to increase with further increases in temperature, and continues to do so as the temperature increases to about 1700° F., the maximum used in the particular test. Brick produced as described in Example 1* and tempered at 600° F., seven hours at temperature, show almost a straight line increase in the dimension measured as temperature increases to 1700° F., while brick tempered at 500° F., seven hours at temperature, follow substantially the same curve as those tempered at 600° F. as the temperature increases to about 550° F.; from about 550° F. to about 750° F. the measured dimension remains constant while, above 750° F. the dimension measured increases almost as a straight line function of temperature. It is believed that the rapid decrease in the measured dimension as temperature increased above 270° F. characterized above as a "failure" illustrates the vulnerability of prior art brick during burn-in and during the early heats of a campaign. It is also believed that the ability of properly tempered brick according to the instant invention to undergo this test without "failure" illustrates their lesser vulnerability in the early portion of a campaign. As previously stated, the phenomenon involved is believed to be polymerization of some component of the pitch; it seems clear that this occurs during the tempering operation, because an untempered brick was found to fail the test under discussion.

* Except for an immaterial variation in periclase sizing.

In producing a pitch bonded refractory according to the invention, it has been ascertained experimentally, the calcium nitrate or other additive can be added as crystals, as in the foregoing Examples, or a solution thereof can equally well be added. Equally satisfactory results have been achieved using either technical grade or chemically pure calcium nitrate.

What we claim is:

1. A pitch bonded refractory consisting essentially of discrete, sized graded aggregate particles, pitch, and a cure accelerator for the pitch, said cure accelerator being magnesium hydroxide, magnesium nitrate, calcium nitrate, zinc nitrate, ferrous nitrate, ferrous sulfide, magnesium carbonate, ferric oxide, ferrosoferric oxide or ferrous sulfate, and constituting from $\frac{1}{2}$ to 2 percent of refractory, based upon the weight of the aggregate, and the pitch constituting from about 3 to 12 percent based upon the weight of the aggregate, and being operative as a binder bonding the discrete size graded aggregate particles to one another.

2. A pitch bonded refractory as claimed in claim 1 wherein the aggregate includes dead burned magnesia.

3. A pitch bonded refractory as claimed in claim 2 wherein dead burned magnesia is the only aggregate.

4. A pitch bonded refractory as claimed in claim 1 wherein the aggregate includes dead burned dolomite.

5. A pitch bonded refractory as claimed in claim 4 wherein dead burned dolomite is the only aggregate.

6. A pitch bonded refractory as claimed in claim 1 wherein the aggregate is carbon.

7. A pitch bonded refractory a claimed in claim 1 wherein the aggregate is an aluminosilicate.

8. A pitch bonded refractory as claimed in claim 1 wherein the aggregate is alumina.

9. A pitch bonded refractory as claimed in claim 2 which additionally contains from $1\frac{1}{2}$ to 3 percent of thermal black, based upon the weight of the aggregate.

10. A pitch bonded refractory as claimed in claim 9 which additionally contains from $\frac{1}{2}$ to 1 percent of sulfur, based upon the weight of the aggregate.

* * * * *